US007302187B1

(12) United States Patent
Roberts et al.

(10) Patent No.: US 7,302,187 B1
(45) Date of Patent: Nov. 27, 2007

(54) MINIMUM TRANSMITTED PHOTON QUANTUM OPTICAL COMMUNICATIONS SYSTEM

(75) Inventors: Mark W. Roberts, San Diego, CA (US); Markham E. Lasher, La Jolla, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 603 days.

(21) Appl. No.: 11/009,845

(22) Filed: Dec. 8, 2004

(51) Int. Cl.
*H04B 10/00* (2006.01)
*H04B 10/12* (2006.01)
(52) U.S. Cl. .................... 398/140; 398/152; 398/183
(58) Field of Classification Search ............. 398/140, 398/152, 182–184, 201, 202, 205; 356/450, 356/497
See application file for complete search history.

(56) References Cited

U.S. PATENT DOCUMENTS 5,418,905 A * 5/1995 Rarity et al. .............. 398/40
6,057,541 A * 5/2000 Steenblik .................. 250/225
7,126,691 B2 * 10/2006 Gat ........................... 356/450
2004/0208638 A1 * 10/2004 Jansen ...................... 398/183

OTHER PUBLICATIONS

Hellmuth, T. et al, "Delayed-choice experiments in quantum interference", Physical Review A, Mar. 1987, pp. 2532-2541, vol. 35, No. 6, USA.

* cited by examiner

*Primary Examiner*—Jason Chan
*Assistant Examiner*—Quan-Zhen Wang
(74) *Attorney, Agent, or Firm*—Peter A. Lipovsky; Allan Y. Lee; J. Eric Anderson

(57) ABSTRACT

A system parametrically down-converts a photon into a pair of first and second quantum-entangled photons. A transmitter is coupled to receive the first photon and includes an irreversible collapse event device for collapsing the quantum-entangled state of each photon in the pair. The collapse is caused by attempting to detect the first photon at the transmitter. Because of quantum-entanglement, collapse of the first photon collapses the second photon of the pair. The transmitter can also be used to not cause the collapse. A receiver includes polarization detectors to detect whether the transmitter has collapsed or left uncollapsed the quantum-entangled state of the photon pair. Causing or not causing the collapse can be used for communication. Every down-converted photon can be used for communication, even though few of the photons actually leave the source and reach the transmitter. This allows communication with a minimal number of transmitted photons.

19 Claims, 2 Drawing Sheets

MINIMUM TRANSMITTED PHOTON QUANTUM OPTICAL COMMUNICATIONS SYSTEM

BACKGROUND OF THE INVENTION

This invention relates generally to communications and, in particular, to a communications system employing the principle of quantum entanglement.

Traditional optical communications systems require a very large number of photons to be sent from a transmitter to a receiver. Typically such information is provided over normal communications channels where the high number of photon transmissions lends itself to interception and eavesdropping.

It is thus desirable to have a photon communication system that minimizes the number of photons transmitted.

SUMMARY

A non-traditional communications system utilizes the quantum mechanics principle of quantum entanglement. An example communication system employing quantum entanglement includes projecting photons through a parametric down-converter. At least some of these photons are each parametrically down-converted into a pair of first and second down-converted photons wherein each of the down-converted photons is in a quantum-entangled state.

A first receiver channel is used to receive the first of the down-converted photons and a first polarization detection arrangement is operably coupled to the first channel to detect the polarization of the first down-converted photon. A second receiver channel is used to receive the second of the down-converted photons and a second polarization detection arrangement is operably coupled to the second channel to detect the polarization of the second down-converted photon.

A transmitter is operably coupled to the first channel and includes a collapse event causation device for selectably causing an alteration in the quantum entangled state of each of the first and second down-converted photons. Such a collapse event can be initiated by an irreversible event such as detecting the presence or lack of presence of a photon at the transmitter. Both the detection or lack of detection of the photon collapses the polarization indeterminate quantum entangled state of the down-converted photon received in the first receiver channel. Because of quantum entanglement, the change to this first down-converted photon of the pair of down-converted photons results in a corresponding change to the second of the down-converted photons of the pair of down-converted photons.

The transmitter also has a non-collapse event causation condition wherein the quantum-entangled state of the pair of down-converted photons is left unchanged by the transmitter. The receiver includes polarization detection arrangements that can detect whether the transmitter has been used to alter or leave unaltered the quantum-entangled state of the pair of down-converted photons created in the parametric down-converter. The purposeful causation of the collapse event or a lack of such purposeful causation can be used for binary communication.

So long as there is some probability that the first down-converted photon can reach the transmitter, all down-converted photon pairs generated can be used for information conveyance, whether or not the first down-converted photon of a pair actually reaches the transmitter. This condition permits a minimal number of actual photon transmissions to the transmitter.

Other objects, advantages and new features of the invention will become apparent from the following detailed description of the invention when considered in conjunction with the accompanied drawings.

DESCRIPTION

Figure 1:
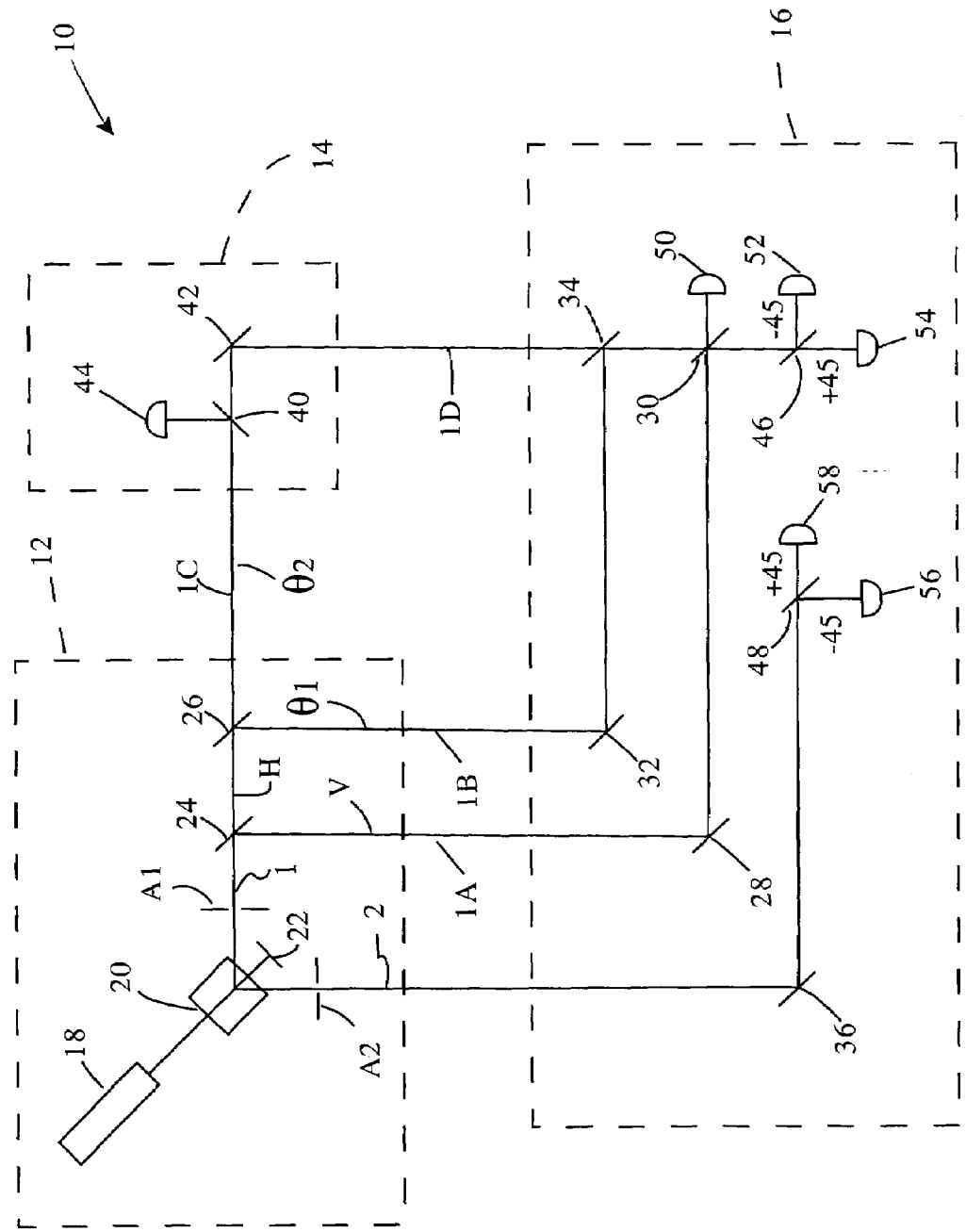
FIG. 1 illustrates an exemplary communications system according to the description herein.

Referring now to FIG. 1, a Mach-Zehnder interferometer-based communications system 10 to be further described herein includes a photon source 12, a transmitter 14 and a receiver 16. An example embodiment includes source 12 and receiver 16 substantially co-located. Transmitter 16 may be located some distance from source 12 and receiver 16.

Source 12 includes, for example, a continuous wave laser 18, a nonlinear crystal 20, a beam stop 22, two apertures (A1 and A2), and two polarizing beam splitters 24 and 26.

Photons from laser 18 are used as "pump" photons in nonlinear crystal (NLC) 20. In NLC 20, a "pump" photon may be annihilated in a parametric down-conversion event in which a pair of first and second ("signal" and "idler" or vice-versa) photons are simultaneously created.

The NLC 20 is typically cut to allow down-conversion via degenerate, noncolinear, type II phase-matching, for example. In this case, pump photons and any signal photons produced via down-conversion are vertically (V) polarized. Idler photons that are produced via down-conversion are horizontally (H) polarized.

Apertures A1 and A2 are placed to output to receiver channels 1 and 2, respectively, to transmit only those signal and idler pairs in which both photons have the same frequency and bandwidth. One of the photons of a down-converted pair will pass through aperture A1 and enter channel 1, and the other photon will pass through aperture A2 and enter channel 2. Apertures A1 and A2 are positioned so that both photons of a down-converted pair will exit the apertures simultaneously.

It is not known which photon (signal or idler) passes through each aperture. The signal and idler photons exit the apertures in superposition, producing the quantum-entangled state:

$$(H_1 V_2 - V_1 H_2)/\sqrt{2}.$$

In this quantum state, the polarization of the individual photons is indeterminate (as if the polarization of each photon is an equal superposition of all allowed polarization states). The only constraint on the polarization is that imposed on the pair by the quantum entanglement condition.

The average rate at which down-converted pairs are emitted from the two apertures is equal to R. The average time interval between the emission of down-converted pairs from source 12 is equal to 1/R.

Because of the way in which NLC 20 is cut, the equal frequency (and equal bandwidth) signal and idler photons exit the NLC at equal angles on opposite sides of the pump beam. For convenience, this equal angle is drawn as 45 degrees (as shown in FIG. 1), but, in practice, it may have a different value.

The down-converted photons may be redirected by reflection from good optical mirrors, after they have passed through the two apertures. This allows transmitter 14 to be placed in any direction from co-located source 12/receiver 16.

After passing through NLC 20, the pump photons that were not annihilated in down-conversion events are discarded into beam stop 22.

The photon of a quantum-entangled pair that exits aperture A1 into channel 1 is incident on polarizing beam splitter 24. Polarizing beam splitter 24 is set to reflect the V polarized component of each incident photon. The V polarized component travels in subchannel 1A to mirror 28 in receiver 16 and then to polarizing beam splitter 30 also in receiver 16. Polarizing beam splitter 24 transmits the H polarized component of each incident photon to polarizing beam splitter 26.

Polarizing beam splitter 26 is set to reflect the polarization component at angle θ1 and to transmit the polarization component at angle θ2. Angle θ1 is set to be only slightly greater than horizontal (H) to result in minimizing the number of photons sent to transmitter 14. Angle θ2 is orthogonal to angle θ1 and is therefor set to be only slightly past vertical (V) in this example.

The θ1 polarized component from polarizing beam splitter 26 travels via subchannel 1B to mirror 32 in receiver 16 and then to polarizing beam splitter 34 in receiver 16. Polarizing beam splitter 26 transmits the θ2 polarized component of each channel 1 photon that is incident on it. The θ2 polarized component travels to transmitter 14 via subchannel 1C.

The photon of each down-converted pair that exits source 12 and is output through aperture A2 into channel 2 travels to mirror 36 in receiver 16 and then to polarizing beam splitter 48 also in receiver 16.

Transmitter 14 includes a fast optical switch 40, a mirror 42 and a detector 44. The optical switch is fast enough that it can be switched "on" or "off" in a time that is much shorter than the average time (1/R) between the emission of down-converted photon pairs from source 12. The optical switch in transmitter 14 may be any of several types, examples of which are an acousto-optic modulator (AOM) or an electro-optic modulator (EOM).

If optical switch 40 is turned on, then there is a certain fixed probability that each photon that arrives at transmitter 14 will be deflected by the optical switch and will be incident on detector 44. Use of system 10 requires that this fixed probability be some value greater than zero. In the example system to be further described, this probability is assumed to be 50%. Photons not deflected by the optical switch pass through the switch undisturbed. Detector 44 along with its associated electronics is capable of photon counting.

If the optical switch in transmitter 14 is turned off, the photons that arrive at the transmitter pass through the optical switch undisturbed and are incident on mirror 42. The photons are reflected by the mirror and are sent via subchannel 1D to polarizing beam splitter 34 in receiver 16.

Example receiver 16 contains four polarizing beam splitters 30, 34, 46 and 48, five detectors (50, 52, 54, 56, 58), and three optical mirrors (28, 32, 36). The detectors (including their associated electronics) are capable of photon counting.

Polarizing beam splitter 34 in receiver 16 is set to reflect the polarization component at angle θ1 (from polarizing beam splitter 26 of source 12) and to transmit the polarization component at angle θ2 (from transmitter 14).

The output from polarizing beam splitter 34 and the V polarized component from polarizing beam splitter 24 of source 12 are incident on polarizing beam splitter 30 in receiver 16. Polarizing beam splitter 30 is set to reflect any incident V polarized component and to transmit any incident H polarized component. If there is a V polarized component in the light that travels from polarizing beam splitter 34 to polarizing beam splitter 30, that V polarized component will be reflected by polarizing beam splitter 30 and will be incident on detector 50.

The output from polarizing beam splitter 30 is incident on polarizing beam splitter 46 in receiver 16. Polarizing beam splitter 46 is set to reflect any incident −45 polarized photon to detector 52 and to transmit any incident +45 polarized photon to detector 54.

The photon of a quantum-entangled pair that exits source 12 through aperture A2 into channel 2 travels to mirror 36 in receiver 16. This photon is reflected at mirror 36 and travels to polarizing beam splitter 48 in the receiver 16. Polarizing beam splitter 48 is set to reflect any incident −45 polarized photon to detector 56 and to transmit any incident +45 polarized photon to detector 58.

The optical path lengths in the system are set so that if the photon from each down-converted pair that is in channel 1 is not incident on detector 44 in the transmitter, then it will be incident on one of the detectors 50, 52 or 54, just before its partner photon that is in channel 2 reaches polarizing beam splitter 48 in receiver 16. Subchannel 1C and subchannel 1D may be free-space paths, optical fibers, or some other transmission media.

To send information from transmitter 14 to receiver 16, the operator at transmitter 14 will either turn on fast optical switch 40 in transmitter 14 (a binary one), or the operator at transmitter 14 will turn off optical switch 40 (a binary zero).

Channel 1 photons may be incident on any one of the detectors 50, 52 or 54 in receiver 16. Channel 2 photons may be incident on either detector 56 or detector 58 in receiver 16. The operator at receiver 16 detects the photons in channel 1 in coincidence with their down-converted partner photons in channel 2 using conventional "coincidence counting" electronics (not shown). The coincidence count information allows the operator at receiver 16 to discern whether the operator at transmitter 14 is sending a binary one message or a binary zero message.

The number of photons (amount of time) required to send a binary message from the transmitter to the receiver will depend on the specifics of the communication channel and the equipment used in the system. A sufficient number of down-converted photon pairs must travel through the system to allow a statistically accurate conclusion to be reached as to which binary message is being sent. This number will depend, for example, on channel/system noise and detector quantum efficiency.

To send a binary zero from transmitter 14 to receiver 16, the operator at transmitter 14 turns off fast optical switch 40. In this case, the θ2 polarized component from polarizing beam splitter 26 in source 12 travels to transmitter 14 and passes through the optical switch undisturbed. This component is then reflected by mirror 42 in transmitter 14 and is sent to polarizing beam splitter 34 in receiver 16.

The optical path length from polarizing beam splitter 26 through transmitter 14 (via mirror 42) to polarizing beam splitter 34 is set equal to the optical path length from polarizing beam splitter 26 through receiver 16 (via mirror 32) to polarizing beam splitter 34. A fiber optic delay line, for example, may be used in the receiver to provide the equal optical path length. Consequently, if the θ2 polarized component is returned from transmitter 14 to receiver 16, the θ1 and θ2 polarized components will recombine "in phase" and with proper amplitudes at polarizing beam splitter 34 to produce an H polarized component in the output from polarizing beam splitter 34. This is what occurs in the binary zero case.

The H polarized component from polarizing beam splitter 34 travels to polarizing beam splitter 30. Polarizing beam splitter 30 is set to reflect any incident V polarized component and to transmit any incident H polarized component. In the binary zero case, there is no V polarized component in the light that travels from polarizing beam splitter 34 to polarizing beam splitter 30. Also, there is never an H polarized component in the light that travels from polarizing beam splitter 24 to polarizing beam splitter 30. Consequently, there is no possibility for a channel 1 photon to be detected in detector 50 in receiver 16 in the binary zero case.

The optical path length in channel 1 from polarizing beam splitter 24 through polarizing beam splitter 26, transmitter 14, and polarizing beam splitter 34 to polarizing beam splitter 30 is set equal to the optical path length from polarizing beam splitter 24 through receiver 16 (via mirror 28) to polarizing beam splitter 30. A fiber optic delay line, for example, may be used in the receiver to provide the equal optical path length. In the binary zero case, equal amplitude, "in phase" H and V polarization components arrive at the two input ports of polarizing beam splitter 30. These two components exit simultaneously from polarizing beam splitter 30 and travel to polarizing beam splitter 46.

In the binary zero case, there is no possibility that a photon from source 12 that is in channel 1 will be detected in either detector 44 in transmitter 14 or in detector 50 in receiver 16. Therefor, the photon from each down-converted pair that leaves aperture A1 in source 12 propagates through the system in channel 1 and ultimately exits from polarizing beam splitter 30 in receiver 16 with its properties unchanged. It then travels to polarizing beam splitter 46. Its down-converted partner photon that exits source 12 via aperture A2 propagates through receiver 16 in channel 2 and ultimately reaches polarizing beam splitter 48.

Thus, if optical switch 40 in transmitter 14 is turned off, each pair of down-converted photons from source 12 arrives at polarizing beam splitter 46 and polarizing beam splitter 48 in receiver 16 in the quantum-entangled state:

$$(H_1 V_2 - V_1 H_2)/\sqrt{2}$$

(wherein the subscripts indicate the channel number).

Polarizing beam splitters 46 and 48 in receiver 16 are both set in the +45/−45 degree polarization basis. In this basis, the quantum-entangled state is written:

$$[(+45_1)(-45_2) - (-45_1)(+45_2)]/\sqrt{2}.$$

Consequently, in the binary zero case with optical switch 40 in transmitter 14 turned off, there are only two possible two-photon coincidence detection events (or detection combinations) at receiver 16. The first occurs when the channel 1 photon is detected in the +45 degree detector, 54, and its partner photon in channel 2 is detected in the −45 degree detector, 56. This is called detection combination (detector 54/detector 56) or the equivalence of a +1/−2 combination. The second possible detection event occurs when the channel 1 photon is detected in the −45 degree detector, 52, and its partner photon in channel 2 is detected in the +45 degree detector, 58. This is called detection combination (detector 52/detector 58) or a −1/+2 combination.

To send a binary one from transmitter 14 to receiver 16, the operator at transmitter 14 turns on fast optical switch 40. For every photon in channel 1, 50% of the θ2 polarized component amplitude from polarizing beam splitter 26 that travels to transmitter 14 is reflected by the optical switch and is incident on detector 44 in the transmitter. The other 50% of the θ2 polarized component amplitude passes through the optical switch undisturbed.

In the binary one case, every photon in channel 1 has a small but finite probability of being detected in detector 44 in transmitter 14. Very few photons will actually be detected in detector 44, because the amplitude of the θ2 polarized component is very small, since angle θ2 is almost orthogonal to the horizontal (H) direction.

The detection of a photon in detector 44 constitutes an "irreversible event". Such an event causes the quantum-entangled state to "collapse". It must be noted, however, that so long as fast optical switch 40 is turned on, the non-detection of a photon in detector 44 also constitutes an "irreversible event".

In the binary one case, any channel 1 photon that exits polarizing beam splitter 30 in receiver 16 cannot be in a quantum-entangled state. In order that a photon be in a (polarization) quantum-entangled state, then, when the photon's polarization angle is measured, every polarization direction must be equally probable. But any channel 1 photon that exits polarizing beam splitter 30, in the binary one case, is more likely to be V polarized than to be H polarized.

Since the photon that exits aperture A1 into channel 1 in source 12 is in a quantum-entangled state (with the photon in channel 2), it is equally probable for the photon to be reflected at polarizing beam splitter 24 as for it to be transmitted through polarizing beam splitter 24.

If the channel 1 photon is reflected at polarizing beam splitter 24, then it is V polarized. This photon cannot be incident on detector 44 in transmitter 14, since it remains at the source 12/receiver 16 location. Also, this photon cannot be incident on detector 50 in receiver 16; it is V polarized and will always be reflected when it reaches polarizing beam splitter 30.

To be incident on either detector 44 in transmitter 14 or detector 50 in receiver 16, a channel 1 photon must first be transmitted through polarizing beam splitter 24. Consequently, the probability that a channel 1 photon that exits polarizing beam splitter 30 is V polarized is equal to the sum of the probability that the photon that exits polarizing beam splitter 30 is H polarized, plus the probability that the photon will be incident on detector 44 in transmitter 14, plus the probability that the photon will be incident on detector 50 in receiver 16.

$$P(V) = P(H) + P(\text{Detector 44}) + P(\text{Detector 50}).$$

Thus, in the binary one case, there is a greater probability for any photon that exits polarizing beam splitter 30 in receiver 16 to be V polarized than for it to be H polarized. This is due to the "irreversibility" of the non-detection event at detector 44 in transmitter 14.

So long as there is a possibility that the channel 1 photon can be incident on detector 44 in transmitter 14, then either the detection or the non-detection of the channel 1 photon in detector 44 insures that the quantum-entangled state collapses.

In the binary one case with optical switch 40 in transmitter 14 turned on, the quantum-entangled state actually collapses when the photon in channel 1 reaches polarizing beam splitter 24 in source 12.

If the photon in channel 1 is transmitted through polarizing beam splitter 24, then the state collapses to $(H_1 V_2)$. In this case, the channel 1 photon will either pass through receiver 16 and exit polarizing beam splitter 30 as an H polarized photon, or, with a small but finite probability, the channel 1 photon will be incident on either detector 44 or detector 50.

If, instead, the photon in channel 1 is reflected at polarizing beam splitter 24, then the state collapses to ($V_1H_2$). In this case, the channel 1 photon will pass through receiver 16 and exit polarizing beam splitter 30 as a V polarized photon.

In the binary zero case with optical switch 40 in transmitter 14 turned off, the photon in channel 1 has zero probability of being incident on detector 44 or on detector 50, and so the photons that arrive at polarizing beam splitter 46 and polarizing beam splitter 48 in receiver 16 are in a quantum-entangled state.

In the binary one case, the collapse of the quantum-entangled state at polarizing beam splitter 24 in source 12 is caused by the non-zero probability that the channel 1 photon can be incident on detector 44 in transmitter 14. Note that transmitter 14 may be located at a considerable distance from source 12/receiver 16. This is one example (of several in quantum systems) of a future event controlling the outcome of a past event. This reversal of the normal-time order of cause and effect is called a "delayed choice" event.

In the binary one case for each pair of down-converted photons, the initial quantum-entangled state will have collapsed by the time that the photon in channel 1 reaches polarizing beam splitter 46 and the photon in channel 2 reaches polarizing beam splitter 48 in receiver 16. One of the two photons will be H polarized and the other will be V polarized.

Polarizing beam splitter 46 is set in the +45/−45 degree basis. Consequently, the H or V polarized photon in channel 1 that reaches polarizing beam splitter 46 has an equal probability of being reflected to detector 52 or of being transmitted to detector 54.

Polarizing beam splitter 48 is also set in the +45/−45 degree basis. The V or H polarized photon in channel 2 that reaches polarizing beam splitter 48 has an equal probability of being reflected to detector 56 or of being transmitted to detector 58.

Thus, in the binary one case, all four two-photon coincidence detection combinations are equally probable. The photons of each down-converted pair may be detected in receiver 16 in any of the detection combinations: (Detector 52/Detector 56) also a −1/−2, (Detector 52/Detector 58) also a −1/+2, (Detector 54/Detector 56) also a +1/−2, or (Detector 54/Detector 58) also a +1/+2.

The additional detection combinations distinguish the binary one case from the binary zero case in which only the two detection combinations (Detector 52/Detector 58) also a −1/+2 or (Detector 54/Detector 56) also +1/−2 are possible.

There is a very small probability that a channel 1 photon will be detected in detector 50 in receiver 16. This detection should occur in coincidence with the detection of the partner photon in channel 2 either in detector 56 or in detector 58. A channel 1 photon can only be detected in detector 50 in receiver 16, if the operator at transmitter 14 is sending a binary one message.

Detection combinations (Detector 52/Detector 56) also a −1/−2 and (Detector 54/Detector 58) also +1/+2 are possible only when a binary one message is being sent from transmitter 14 to receiver 16. However, since two of the possible detection combinations, (Detector 52/Detector 58) also −1/+2 and (Detector 54/Detector 56) also +1/−2, are common to both binary one and binary zero messages, the transmission of information using this system is inherently probabilistic. Consequently, each binary message will be represented by a certain total number of pairs of down-converted photons.

As an example, 20 pairs of photons could be used to represent each of the two binary messages (either a one or a zero). To send a binary one message to receiver 16, the operator at transmitter 14 would turn on optical switch 40 for a time sufficient to insure that 20 pairs of down-converted photons should be detected at receiver 16. On average, 10 of the 20 pairs of photons detected at receiver 16 should result in detection combinations (Detector 52/Detector 56) also −1/−2 or (Detector 54/Detector 58) also a +1/+2. These two detection combinations are not possible in the binary zero case. Consequently, the receipt of either of these detection combinations allows the operator at receiver 16 to determine that the operator at transmitter 14 is sending a binary one message.

In this example, to send a binary zero message to receiver 16, the operator at transmitter 14 would turn off optical switch 40 for a time sufficient to insure that 20 pairs of down-converted photons are detected at receiver 16. None of the 20 pairs of photons detected at receiver 16 should be in detection combinations (Detector 52/Detector 56) also −1/−2 or (Detector 54/Detector 58) also a +1/+2. The absence of either of these two detection combinations in any of the detected pairs allows the operator at receiver 16 to discern that the operator at transmitter 14 is sending a binary zero message.

Because the transmission of information is probabilistic, there is a certain probability that a transmission error will occur when this system is used. A transmission error occurs when the operator at transmitter 14 sends one type of message (binary one, for example), but, based on the received detection combinations, the operator at receiver 16 declares that a different type of message (binary zero) was received.

If 20 pairs of down-converted photons are used to send each binary message, then the probability of a transmission error, of mistaking a binary one message for a binary zero message (or vice versus), becomes approximately one in one million. If more than 20 pairs of down-converted photons are used to send each binary message, then the probability that a transmission error will occur will be even less likely than one in one million.

The major advantage of this system is that it allows information to be sent from a transmitter to a receiver, even though very few photons actually leave the source/receiver and reach the transmitter.

Those photons that actually travel to transmitter 14 may or may not return to receiver 16 depending on the binary message that is being sent. In the binary zero case, any channel 1 photon that actually travels to transmitter 14 will be sent back to receiver 16. In the binary one case, 50% of the channel 1 photons that actually travel to transmitter 14 will not leave the transmitter.

In the following, it is assumed that the horizontal (H) polarization direction is 0 degrees and that the vertical (V) polarization direction is 90 degrees.

If polarizing beam splitter 26 in source 12 and polarizing beam splitter 34 in receiver 16 are set so that angle $\theta 1$ is equal to 1 degree and angle $\theta 2$ is equal to 91 degrees, then, on average, only 1 of every 6566 photons that exits aperture A1 in channel 1 will actually leave the source/receiver location and travel to transmitter 14. The other 6565 photons (of 6566) will remain at the source 12/receiver 16 location. Note, however, that all 6566 photons are capable of transferring information from transmitter 14 to receiver 16.

If, as in the example above, 20 pairs of down-converted photons are used to represent each of the two possible binary messages, then approximately 328 bits of information are transmitted per the photon that leaves the source 12/receiver 16 and travels to transmitter 14. This number will be reduced in practice, depending on system/channel noise and detector quantum efficiency.

If angle θ1 is set closer to horizontal, and angle θ2 is set equally close to vertical, then there will be an increase in the number of bits of information sent from transmitter 14 to receiver 16 per photon that leaves the source 12/receiver 16 location and travels to transmitter 14.

Figure 2:
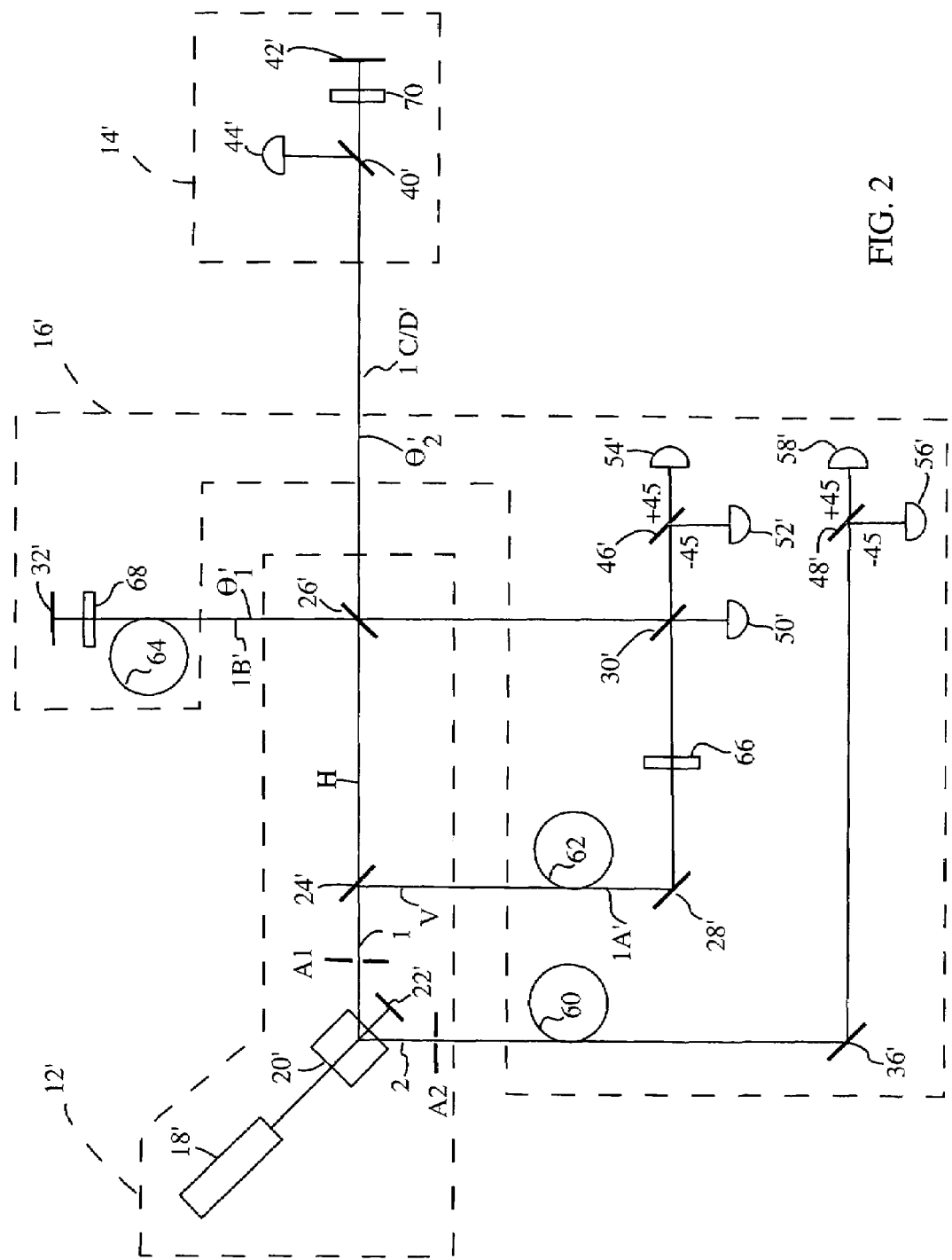
FIG. 2 shows another exemplary communications system according to the description herein.

Referring now to FIG. 2, an alternative embodiment is shown having a Michelson interferometer origin. The system shown in FIG. 2 functions in substantially the same way as the system shown in FIG. 1.

Contrary to the design of FIG. 1, the design shown in FIG. 2 has only a single channel (1C/D') between source 12'/receiver 16' and transmitter 14' and has one less polarizing beam splitter than the design in FIG. 1.

The FIG. 2 design does include additional components compared to the design shown in FIG. 1. These components include three fiber optical delay lines (60, 62 and 64). All three of the fiber optical delay lines (FODLs) are located in receiver 16'. The FODLs are provided to insure equal optical path lengths for the photons through the different paths in the system.

The design shown in FIG. 2 also contains three waveplates: half waveplate 66, and quarter waveplates 68 and 70. Half-wave plate 66 rotates the polarization direction of photons that pass through the waveplate by 90 degrees (from V to H). The two quarter-wave plates (68 and 70) are also used to rotate the plane of polarization of incident photons. For both quarter waveplates 68 and 70, incident photons pass through each waveplate in one direction and are then reflected and travel back through the waveplate in the reverse direction. The quarter-wave plates are set so that the polarization direction of each incident photon is rotated by 90 degrees after the photon has passed through one of the waveplates twice (once in each direction).

The systems disclosed can also be used for intrusion detection. In this use, the optical switch and detector of the transmitters described above would not be needed. Depending on the location of polarizing beam splitter 30 or 30' in the receiver, one or more optical mirrors would serve as the transmitter. The system would be set in the "binary zero" mode as described above. Any intruder that passed through the optical path either to or from the transmitter would act just like the optical switch in the communications design described above, and would cause a "binary one" message to be sent to the receiver. This would alert the operator at the source/receiver to the intrusion. The benefit of using this system for intrusion detection is the very small number of photons that would actually propagate through the intrusion protection "beams". Very few of the photons would actually leave the source/receiver location and travel through the intrusion prevention "beams", even though all of the photons could be used to sense an intruder. This would make it extremely difficult for an intruder to determine whether or not an intrusion device was in operation, or where the device's "beams" were located, thus making it difficult for the intruder to avoid the "beams".

Obviously, many modifications and variations of the invention are possible in light of the above description. It is therefore to be understood that within the scope of the claims, the invention may be practiced otherwise than as has been specifically described.

What is claimed is:

1. An apparatus comprising:
   a source of photons;
   a parametric down-converter wherein at least some of said photons are each converted into a pair of first and second down-converted photons wherein each said down-converted photon is in a quantum-entangled state, and wherein alteration of a characteristic of one of said first and second down-converted pair of photons alters a corresponding characteristic in the other of said first and second down-converted pair of photons;
   a receiver having
      a first channel to receive said first down-converted photons from said parametric down-converter and a first polarization detection arrangement operably coupled to said first channel to detect polarization of said first down-converted photons, and
      a second channel to receive said second down-converted photons from said parametric down-converter and a second polarization detection arrangement operably coupled to said second channel to detect polarization of said second down-converted photons; and
   a transmitter operably coupled to said first channel, said transmitter including a collapse event causation device for selectably causing a polarization alteration in said quantum entangled state of each photon in said pairs of said first and second down-converted photons.

2. The apparatus of claim 1 wherein said first photon is an idler photon and wherein said second photon is a signal photon.

3. The apparatus of claim 1 wherein said first photon is a signal photon and wherein said second photon is an idler photon.

4. The apparatus of claim 1 wherein said source of photons is a laser.

5. The apparatus of claim 4 wherein said laser is a continuous wave laser.

6. The apparatus of claim 1 wherein said parametric down-converter is a nonlinear crystal.

7. The apparatus of claim 1 wherein said transmitter includes at least one mirror.

8. The apparatus of claim 1 wherein said first and second polarization detection arrangements each include a pair of mutually orthogonally positioned detectors.

9. The apparatus of claim 1 wherein down-conversion in said down-converter is non-colinear, degenerate, type II phase-matching down-conversion.

10. The apparatus of claim 1 wherein said transmitter includes an acousto-optic modulator optical switch.

11. The apparatus of claim 1 wherein said transmitter includes an electro-optic modulator optical switch.

12. An apparatus comprising:
   a laser for generating a source of photons;
   a non-linear crystal parametric down-converter wherein at least some of said photons are each converted into a pair of first and second down-converted photons wherein each said down-converted photon is in a quantum-entangled state, and wherein alteration of a characteristic of one of said first and second down-converted pair of photons alters a corresponding characteristic in the other of said first and second down-converted pair of photons;
   a receiver having
      a first channel to receive said first down-converted photons from said parametric down-converter and a first polarization detection arrangement including a pair of mutually orthogonally positioned detectors, said first polarization detection arrangement being operably coupled to said first channel to detect polarization of said first down-converted photons, and a second channel to receive said second down-converted photons from said parametric down-converter and a second polarization detection arrangement including a pair of mutually orthogonally positioned detectors, said second polarization detection arrangement being operably coupled to said second channel to detect polarization of said second down-converted photons; and a transmitter operably coupled to said first channel, said transmitter including a collapse event causation device for selectably causing a polarization alteration in said quantum entangled state of each photon in said pairs of said first and second down-converted photons.

13. The apparatus of claim 12 wherein said first photon is an idler photon and wherein said second photon is a signal photon.

14. The apparatus of claim 12 wherein said first photon is a signal photon and wherein said second photon is an idler photon.

15. The apparatus of claim 12 wherein said laser is a continuous wave laser.

16. The apparatus of claim 12 wherein said transmitter includes at least one mirror.

17. The apparatus of claim 12 wherein down-conversion in said down-converter is non-colinear, degenerate, type II phase-matching down-conversion.

18. The apparatus of claim 12 wherein said transmitter includes an acousto-optic modulator optical switch.

19. The apparatus of claim 12 wherein said transmitter includes an electro-optic modulator optical switch.

* * * * *